United States Patent
Burnett

(10) Patent No.: US 7,333,988 B2
(45) Date of Patent: Feb. 19, 2008

(54) METHOD FOR CONSTRUCTING AND CACHING A CHAIN OF FILE IDENTIFIERS AND ENABLING INHERITANCE OF RESOURCE PROPERTIES IN FILE SYSTEMS

(75) Inventor: Rodney Carlton Burnett, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/520,270

(22) Filed: Sep. 13, 2006

(65) Prior Publication Data

US 2007/0011139 A1 Jan. 11, 2007

Related U.S. Application Data

(62) Division of application No. 09/833,346, filed on Apr. 12, 2001, now Pat. No. 7,185,013.

(51) Int. Cl.
G06F 17/30 (2006.01)

(52) U.S. Cl. .............................. 707/9; 707/3; 707/100; 707/2; 707/10

(58) Field of Classification Search ................... 707/9, 707/203

See application file for complete search history.

(56) References Cited

U.S. PATENT DOCUMENTS 4,613,901 A * 9/1986 Gilhousen et al. .......... 380/239

5,355,474 A * 10/1994 Thuraisngham et al. ....... 707/9

OTHER PUBLICATIONS

Park et al. Information system interoperability: What lies beneath ? ACM Transactions on Information System, vol. 22, Issue 4, pp. 595-632, Oct. 2004.*

(Continued)

Primary Examiner—Cam-Y Truong
Assistant Examiner—Baoquoc N. To
(74) Attorney, Agent, or Firm—Jeff LaBaw; Darcell Walker

(57) ABSTRACT

The techniques of the present invention involve constructing and caching a chain of FIDs that represent the directory path to a system resource. Typically a lookupname( ) service returns a handle to the object and a handle to the object's owning directory. The owning directory handle can then be used to obtain a file identifier (FID) for the owning directory. This FID constitutes the first FID in the chain and will also act as the lookup key in the cache. The process next finds the directory's parent. A FID is obtained with the parent handle. This FID is added to the chain. The process repeats until the root of the system's file tree is reached. This result is a chain or array of FIDs representing the full path name of the directory containing the accessed object. The chain begins with the directory FID closest to the accessed object and ends with the FID representing the root of the file tree. Once constructed, the FID chain which forms a binary representation of a directory path name is placed in a cache. The cached chain remains valid unless a rename operation occurs on any FID components in the chain. On an object access, the process obtains a FID for the object's owning directory. This FID which represents the first FID in a FID chain is then used to search the FID chain cache. If a match is found, then the cached FID represents the path name for the access object. With this found chain, the expense of constructing the additional component FIDs for the object's owning oath is avoided.

3 Claims, 7 Drawing Sheets

OTHER PUBLICATIONS

Wallach et al. SAFKASI: a security mechanism for language-based systesm, ACM Transactions on Software Engineering and Methodology (TOSEM), vol. 9, Issue 4, pp. 341-378, Oct. 2000.*

Zanin et al. Towards a formal model for security policies specification and validation in teh selinux system, Symposium on Access Control models and Technologies, Session: Security analysis, pp. 136-145, 2004.*

Switt et al. Improving the granularilty of access controls for Windows 2000, ACM Transaction of Information and System Security (TISSEC), vol. 5, Issue 4, pp. 398-437, 2002.*

Yu et al. A compress accessibility map for XML, ACM Transaction on Database System (TODS), vol. 29, Issue 2, pp. 363-402, Jun. 2004.*

* cited by examiner

METHOD FOR CONSTRUCTING AND CACHING A CHAIN OF FILE IDENTIFIERS AND ENABLING INHERITANCE OF RESOURCE PROPERTIES IN FILE SYSTEMS

CROSS-REFERENCE TO RELATED APPLICATION

This application is a divisional application of and claims priority from patent application Ser. No. 09/833,346, filed on Apr. 12, 2001, now U.S. Pat. No. 7,185,013, the contents of which are incorporated herein by reference.

FIELD OF THE INVENTION

The present invention relates generally to a technique for controlling access to file system resources using externally stored attributes. More specifically, this invention describes a technique in which the externally stored attribute, such as an authorization security policy, uses an array of file system identifiers to determine access to a file system resource list in this array.

BACKGROUND OF THE INVENTION

Many of the UNIX operating systems of today support the generation of file identifiers for file system resources. A FID is a binary representation that uniquely defines a physical file system object that resides in a file system. The FID is typically a stream of bytes of arbitrary length that is commonly as small as eight to ten bytes in size. The contents of the FID bytes are often numerical in nature with the first set of bytes holding an index or "inode" number and the remaining bytes holding a generation or use instance of the inode.

Fids are used in present day operating systems for the implementation of network file sharing services. A file server process running on a file system server machine housing data will obtain a FID for a file when a client machine on a network searches for the file by name. The server will then return the FID to the client. The client sends the FID in subsequent requests to the server to perform operations on the file such as reading or writing data. The server uses the FID to quickly find the file system object's data structure and perform the operation. Thus in a network file system implementation, the FID acts as a alternate representation that can be quickly mapped to the object's defining data structure which often is a inode/vnode. Inode and vnode are used synonymously in this description. The vnode is an in-memory object that usually has a short lifetime and is frequently recycled for use by other accessed file objects. However the FID allows fast construction of a vnode for the unique physical file system object it describes.

The numerical nature, typically small size, and unique mapping to an individual file system object make the FID a powerful association tool. Given that the FID represents a single instantiation of an object, it also represents a unique mapping for any of the potential pathnames or alternate descriptors that can be used by an application to access the object. Thus a FID can be used as an efficient bi-directional mapping equivalent of file system object and any of its names.

FIDS are a powerful concept as their finite size and numeric nature make them suitable for efficient storage and searching. Once a FID is obtained through a file resource name to FID translation, it can be used to quickly obtain access to the actual underlying file system object data structures and access methods. The properties of FIDs make them useful in distributed file system server implementations for projecting a "file handle" out to client systems. The client can then provide the handle back to the server so it can quickly locate the associated resource's underlying data structure and perform operations requested by the client.

As has been mentioned, FIDS are beneficial in UNIX distributed file system implementations. Servers generate and provide FIDS to clients for use in subsequent transactions against the file resource corresponding to the FID. For example, writing data to the file. In the above example of /usr/local/bin/date, the client would first lookup the file by its name (/usr/local/bin/date) at the server. The server would return a FID for date along with other resource attributes for date. The client would then contact the server for additional operations providing the FID to the server. The FID allows the server to locate and operate on the underlying file resource much faster than if it had to process the file path name on each call from the client. If after accessing date, the client desired to create a new file called time in /usr/local/bin, it would first contact the server with the name /usr/local/bin to get the FID for bin. Next it would send another request to the server to create time in the directory bin using bin's FID. Situations like this where components higher up in a directory tree end up being accessed are actually common. One optimization in the above procedure would have been for the server to return the FIDS for all the components in the pathname leading to date as well as vi when the client first accessed /usr/local/bin/date by name at the server. This would have saved the server call to get the FID for /usr/local/bin. In a networked environment the savings could be significant. If there are other clients performing similar accesses to the server then even more calls are saved. Thus in the above example, the efficiency of the network file system protocol could potentially be improved by having the server return an array of FIDS for all the components along the file path provided in an initial client lookup request.

FIDS have other potential uses outside of network file system implementations as well. File resources in UNIX are represented in an inverted tree name space with the / character separating the components along the file path to the file resource. Each component represents a file system resource. The terminating component represents the target file resource of the path and the prior components represent a series of directories leading to the resource. For example, a path of /usr/local/bin/date specifies the path to the file resource named date which resides in the directory /usr/local/bin. The path contains four components with at least three of them being directories and the fourth terminating component (date) representing several possible file resource types. Resource types include directories, files, links, and special device files. The FID relationship exists at the individual file resource level. Thus in the example of /usr/local/bin/date, there are four associated FIDS.

FIDS have a unique one to one relationship to the physical file resources in a file system. In addition, the UNIX operating system can produce FIDs for the many forms of named or non-named methods an application program might use to access them. This property makes FIDS a good association tool for applying external attributes to file resources. One of the resource's well known names such as its full pathname starting at the file system root are used in a database of attributes which might be anything from extended information about the resource to rules describing additional security protections on the resource. Such a method is described in IBM Patent Application AUS9-2000-0672 titled "A Method for Attachment and Recognition of External Authorization Policy on UNIX File System Resources". In the described methods security policy is placed on file resources using the full path name starting at the root of the file system. For example, /usr/local/bin/date. This name known as a protected object name (PON) is used as the name for locating the defined attributes. The PONs are then processed into their associated FIDs thus creating a mapping between the resource's FID and the defined external attributes. When file resources are accessed by applications, the file specification used in the access is converted into a FID, which can then be used to find the attributes in the external database.

An extension of those methods would be to traverse up the directory path of the resource towards the root of the file tree searching for components having attached attributes when the target of the access has no attached attributes. If an external attribute is found in the search, then it could be inherited and be treated as the effective attribute for the accessed file system resource. For both of the above examples, there exists an opportunity for operational improvement if an array of FIDS representing all the components along a file path to a file resource are available. To utilize this feature, methods that produce FIDS require techniques to create such an array of FIDS. The cost of producing an individual FID requires a lookup operation on the file system resource name. This lookup operation requires a relative degree of computational expense. Therefore techniques to produce such an array need to be efficient to minimize the performance impacts to the system. With efficient techniques and methods to produce a FID array, systems, which use FIDs in their processing, can exploit new mechanisms for more efficient operation or to support new features.

SUMMARY OF THE INVENTION

It is an objective of the present invention to provide a method for producing an array of FIDs representing the full file path name staring the root of the file system for a file resource.

It is a second objective of the present invention to provide a method for storing a generated FID chain.

It is another objective of the invention to provide for retrieval of stored FID chain data on subsequent file system accesses involving the same directory path represented by a cached FID chain.

It is another objective of the present invention to provide a method for invalidating a cached FID chain entry when operations occur that might render stored entries stale.

It is another objective of the present invention to enable the capability of implementing inheritance along a file resource's directory path to the resource.

It is another objective of the invention to provide for the association, recognition, and processing of external attributes utilizing an array of system object file identifiers.

This invention describes a method for constructing an array of file identifiers "FIDs" also known as a FID chain, which represents all the directory components of a file system pathname to a file system resource. These components represent the individual file system resources in the form of directories, which must be traversed along the file system hierarchy in order to access the file system resource represented by the terminating component in the path. A FID for a component has the notation FID(component). For example, a file path of /usr/local/bin/date would result in FID chain with FIDs such as FID(usr), FID(local), FID(bin). FID(bin) would be the terminating FID of the directory path. "date" would be the terminating component of the entire path specification including date. Once a FID chain is constructed, it is inserted into a storage location known as a "FID chain cache". The terminating FID of the chain acts as the search key to locate a FID in the cache. In the above example of /usr/local/bin/date, FID(bin) would be the search key.

Another feature of the present invention is a method to keep the cached information from becoming stale. In this process, mechanisms are provided to invalidate cached FID chains in the event an operation occurs which could affect the file system name space. For example if /usr/local was renamed to /usr/loc, then the name space would change making a cached FID chain for /usr/local/bin stale. To enable the use of FID chains, this invention provides techniques for retrieving FID chains and for processing the chains to implement inheritance. With this inheritance, a component of the FID chain would inherent the security policy that governs another component of the FID chain.

The invention is implemented in the context of a resource security classification system. This system will also be referred to as an SCS. In the example system, a database of security classifications is defined for named system resources. The names used for the resource are full file system path names of those resources, starting at the root of the file name space. Examples of full path names would include /usr/local/bin and /home/joe/projectX/datafiles/dfile. These names will also be referred to as defined names or DNs in subsequent text. The security classification database (SCDB) contains security categories for the DNs. Example security categories might include, public, confidential, internal use only, and top secret. A security classification category will further be referred to as an SCC.

The techniques of the present invention involve constructing and caching a chain of FIDs that represent the directory path to a system resource. First the target resource name is processed using a sequence of operating system services. Typically a lookupname( ) service is provided which given a valid object path name returns a handle to the object and a handle to the object's owning directory. In a UNIX system, this handle is commonly called a vnode. The owning directory handle can then be used to obtain a file identifier (FID) for the owning directory. This FID constitutes the first FID in the chain and will also act as the lookup key in the cache. The process next finds the directory's parent. This parent is found using a vn_lookup( ) method, which takes a directory vnode and a well-known name designation for directory's parent directory. It returns a handle (vnode) to the directory's parent. An example call might be:

Code=VOP_LOOKUP(handle, "..",&parentHandle);

With this obtained parent handle, a FID is obtained using a VOP_FID( ) service. This FID is added to the chain. The process repeats until the root of the system's file tree is reached. This result is a chain or array of FIDs representing the full path name of the directory containing the accessed object. The chain begins with the directory FID closest to the accessed object and ends with the FID representing the root of the file tree. Once constructed, the FID chain, which forms a binary representation of a directory path name, is placed in a cache. The cached chain remains valid unless a rename operation occurs on any FID components in the chain. On an object access, a FID for the object's owning directory is obtained. This FID, which represents the first FID in a FID chain, is then used to search the FID chain cache. If a match is found, then the cached FID represents the path name for the access object. With this found chain, the expense of constructing the additional component FIDs for the object's owning path is avoided.

The functional goal of the example embodiment is to monitor accesses to file system resources and audit the use of the resources based on the classification level. The system seeks to utilize the feature of inheritance when the accessed target resource does not have an externally associated classification. For example, if the path /usr/local was classified as internal use only, then an access to /usr/local/bin/date would be considered an access to internal use only data assuming /usr/local/bin and /usr/local/bin/date had no defined classification. Finally, the SCS reports statistics on the count of accesses to each classification category. In an actual implementation, such statistics might be maintained in memory for retrieval through application programming interfaces (APIs) or the data may be logged on non-volatile media such as a disk.

In summary, the functions of the example embodiment are to allow the definition of security classifications on file system resources, monitoring accesses to the resources, and recording statistics for the accesses based on the classification category, which applied to the access. The SCS uses the techniques described in the present invention to achieve its functional goals. In addition, the SCS example implementation is based on the use of FIDs as an association object to the DNs and SCC information defined in the SCDB. FIDs are also used in the monitoring component of the SCS to recognize the existence of defined security classification data on a file system resources being accessed or on one of the file system resources associated with the directory components traversed along the file system path name to the accessed resource. The techniques of this method are described in IBM patent application AUS9-2000-0672.

DETAILED DESCRIPTION OF THE INVENTION

The present invention is described in the context of a UNIX operating system. The described steps would also be applicable to UNIX like operating systems such as Linux and could be generally applied to systems, which provide internal FID like concepts to describe file system resources. The invention describes a set of techniques and logic flows for constructing arrays of FIDs also known as FID chains. It further describes techniques to cache constructed FID chains for subsequent reuse to avoid the costly processing involved in constructing a FID chain from scratch. In addition, a technique is provided using FID chains to enable the feature of inheritance of properties from file system resources along the directory path to the destination resource. These techniques are described in detail within the above example described Security Classification System (SCS). The example system employs FIDs as a fundamental association tool between actual file system resources and fully defined names known as DNs, which are used to name the records in the Security Classification Database (SCDB). The techniques for FID association and the use of FIDs at resource access time for recognition of external named properties can be found in IBM Patent Application AUS9-2000-0672.

Figure 1:
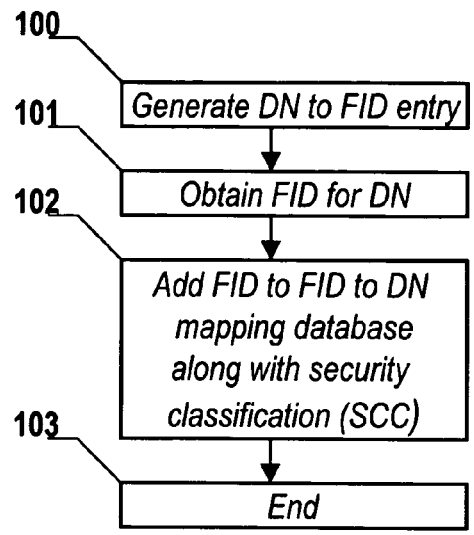
FIG. 1 shows a flow diagram of the steps in the example SCS embodiment to process a DN from the SCDB into a FID to DN mapping database.

Referring to the implementation of the invention in FIG. 1, described is the set of steps involving the processing of SCS records which consists of DNs and their defined security classification category (SCC). The flow of steps shows the processing of each DN/SCC pair into a mapping database, which hold FID to DN mappings. Each mapping also contains the SCC attribute. The flow starts in step 100 by providing the DN and SCC as inputs. In step 101, a FID is obtained for the DN. The FID is generated using programming interfaces (also called services) resident in the native operating system. The technique then proceeds to step 102 where a FID to DN mapping containing SCC data is added to the FID to DN mapping database. This database could reside in the memory of a computing or process system or might reside on non-volatile storage such as a disk. The flow then ends with step 103.

Figure 2:
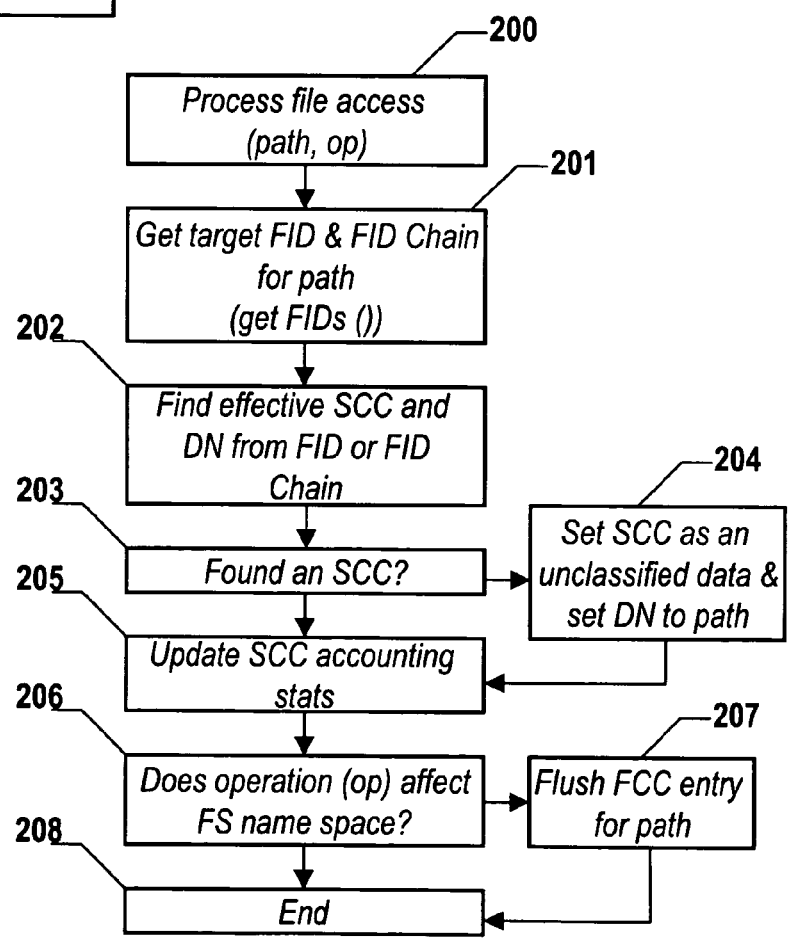
FIG. 2 shows a flow diagram of the steps in the example SCS embodiment for monitoring file system resource accesses, finding effective security classifications for the resource, collecting statistics, and potentially invalidating cached FID chain information.

FIG. 2 presents the processing steps that occur when an application attempts to access a file and the SCS monitoring component intervenes in the access. The process begins with step 200 where the SCS invokes this process and provides as input the path name used to access the underlying file system resource and the type of operation on the resource. The pathname would be one of the many possible variations supported by UNIX such as a full name (e.g. /usr/local/bin/date) or a relative name (. ./. ./bin/date). The operation describes what type of action is being performed on the resource. Examples of operations could include read, write, change permissions, or rename. The flow proceeds to step 201 where the FID for the target of the access (date) is obtained along with a FID chain for the directory (/usr/local/bin), which is traversed to get at date. The processing of this step is further detailed in FIG. 4 of the present invention. Step 202 searches the FID to DN/SCC mapping database to locate an SCC definition. Step 202 finds the effective SCC and DN from the FID or FID chain. The search of the mapping database is described in greater detail in FIG. 3 of the present invention. If no SCC is found in step 203, the process proceeds to step 204 where the SCC definition is defaulted to the category "unclassified" and the DN is set to the path used in the file system resource access. Step 204 would then proceed to back to the main processing path indicated by step 205. If in step 203 a SCC was found and returned in the mapping database search, the flow proceeds directly to step 205 where the accounting data maintained by the SCS is updated. An update could include incremented the count of accesses for the given classification and perhaps adding a record to the monitoring log consisting of the DN corresponding to the access and the classification defined for the DN. The process then proceeds to step 206 where the desired operation is checked to determine if the operation could affect the file system name space. An operation such as a rename on a directory could have such an effect and potentially render a cached FID chain in the FID chain cache (FCC) as stale. For example, if /usr/local where renamed to /usr/loc, then any FCC entry containing a FID for local would be stale and would require invalidation. The invalidation logic is detail in FIG. 6. If in step 206, the operation requires an FCC flush, step 207 is invoked to flush the entries related to path. Step 207 then proceed back to the main logic flow which ends with step 208. If in step 206, the operation does not affect the file system name space, then logic proceeds directly to stop 208 where the process of FIG. 2 ends.

Figure 3:
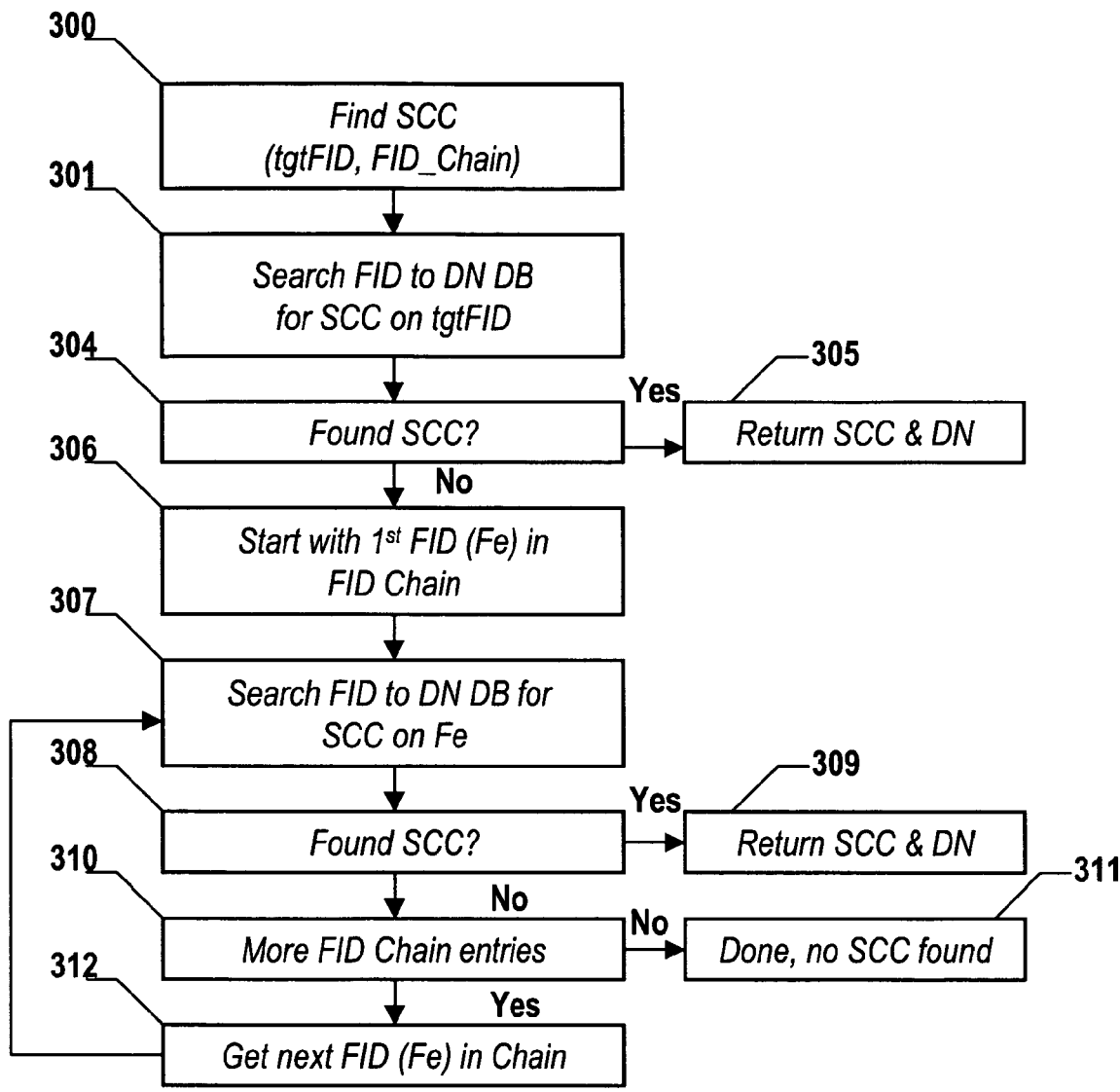
FIG. 3 is a flow diagram of the steps in the example embodiment to check for the presence of attached security classifications on an accessed file system resource. In the absence-attached properties, a search along the resource's associated FID chain in order to discover the presence of attached properties, which should be inherited.

FIG. 3 describes the flow of steps to search for an entry in the FID to DN/SCC mapping database provided a FID (tgtFid) representing the a file system resource target which in this example is the final target of a file system resource access. In the previously presented example of /usr/local/bin/date, the target would be date. In addition, the FID chain for the directory path is the target described by tgtFID. In the example of /usr/local/bin/date, the FID chain would be the array of FIDs for /usr/local/bin/date. The FID chain is actually organized in reverse order. In other words, using the notation of FID(component name) to represent a FID for a corresponding directory path name component; the FID chain for /usr/local/bin would be represented as FID(bin), FID(local), FID(usr). This order facilitates a search for an SCC association starting with the directory closest to the accessed target (tgtFid) and proceeding up the directory path toward the root of the file system name space. The effect is that if an SCC mapping is found for a component FID along the directory path, it is the SCC mapping "closest" to the accessed resource (tgtFid) which acts as the effective inherited SCC for tgtFid. The set of steps in the search begins by providing inputs in step 300. The process moves to step 301 where the mapping database is searched for a mapping entry corresponding the FID (tgtFID), which in the example path would be date. The details of the search mechanisms could be implemented in a variety of ways and are not important in describing the techniques of the present invention. The flow proceeds to step 304 where there is an inquiry whether an SCC was found for tgtFid. If so, the processing ends in step 305 with the found SCC and DN being returned to invoker of the steps of FIG. 3. If in box 304, an SCC is not found, then the processing proceeds to step 306 where the first FID in the FID chain (FID(bin)) is taken from the chain. The logic then proceeds to step 307 where the mapping database is again searched looking for a SCC/DN mapping using the FID from the chain. If in step 308, an SCC and DN are found, the process proceeds to step 309 where the "inherited" SCC/DN information is returned to the invoker. If an SCC is not found, then the process proceeds to step 310 which checks to see of there are more FIDs in the FID chain. If not, the processing ends with step 311, which returns to the invoker with no SCC being found. If in step 310, more FID chain FIDs exist, then the flow proceeds to step 312, which retrieves the next FID in the chain. Processing then returns to step 307 where the mapping database is searched using the new FID in the chain.

Figure 4:
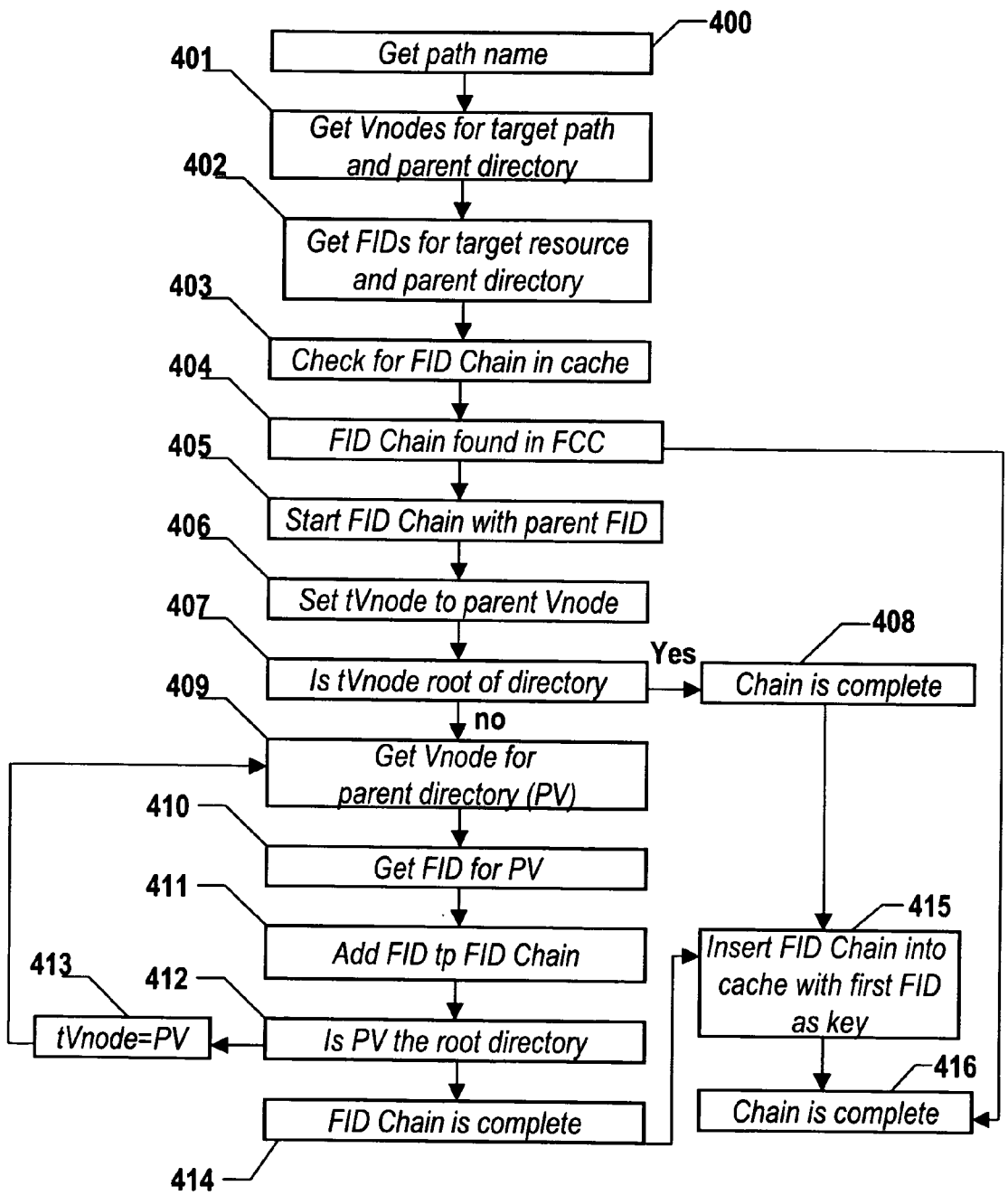
FIG. 4 is a flow diagram of the steps to obtain a FID for an accessed resource along with a FID chain for the directory path where the accessed resource resides provided a valid file name specification for a file system resource.

FIG. 4 shows the flow of steps to create and return a FID for the file system resource described by the provided path. In addition, this step produces and returns a FID chain representing the full directory path starting at the root of the file system name space, which leads to the resource of path. The flow starts with step 400 by providing the path name of a file resource (path). The process moves to step 401 where the UNIX operating system function lookupname( ) is used to obtain an underlying data structure, which is called a "vnode". The service "lookupname( )" takes a path name as input and returns the vnode and optionally can also return a vnode for the parent directory where the file system resource described by path resides. In the presented logic flow, lookupname( ) is used to obtain a vnode for both the resource described by path (the target) as well as the parent directory (the parent) where the target resides. The flow continues to step 402 where the vnodes from step 401 are used to obtain the FID (tgtFid) for the target and the FID (dirFid) for the parent. The FID is obtained using the operating system function VOP_FID( ) that takes the vnode as an input and returns a FID. VOP_FID( ) is a function found on most every commercial UNIX implementation today. If a VOP_FID( ) function does not exist, then alternative methods can be used to construct a FID such as those described in a co-pending patent application docket number AUS9-2000-0672. With the obtained FIDs, the processing proceeds to step 403 where the FID chain cache (also known as the FCC) is consulted to determine if a chain corresponding to the directory path ending with the directory component represented by dirFid is already cached. The steps of searching the FCC are detailed in FIG. 5 of this description.

The FCC is organized such that the terminating directory component of a chain of FIDs is used as the search key. For the example, file path name of /usr/local/bin/date, "bin" is the terminating directory component of the path leading to the file resource "date". Correspondingly, the FID for "bin" (FID(bin)) is the key in the cached chain for /usr/local/bin. Given that a FID is a unique representation of a file system resource, it uniquely represents the directory component bin, and until the file system name space is changed, it also uniquely represents the location of bin in the file system name space (/usr/local). As a result, finding an entry in the FCC for the key of FID(bin), represents a hit on the FID chain that represents the full path of directories including "bin", starting from the root of the file system name space (root). In the example of, /usr/local/bin/date, the associated FID chain for bin, represents the complete chain of directories starting at the root and leading to the file system resource date. In other words it is the FID chain for /usr/local/bin.

After consulting the FCC, the process moves to step 404 where there is a determination whether a FID chain was found in the FCC. If a FID chain was found in the FCC, then the FID for the target resource and the FID chain for the parent have been obtained, and the flow proceeds to step 416 where the FID and FID chain are returned to the caller. If the test in step 404 results in a FID chain not being found in the FCC, then the flow proceeds to step 405 which begins the steps to construct a FID chain for the parent directory (the parent) where the target specified by path (the target) resides. The construction of a FID chain for the parent begins in step 405 by starting the FID chain with the FID of the parent (dirFid). In the example path of /usr/local/bin/date, dirFid is the FID for bin represented by the notation FID(bin). As was previously described, FID(bin) will represent the key for this FID chain and will also represent the first FID entry in the FID chain. The logic flow now proceeds to step 406 where the temporary vnode variable "tVnode" is introduced to facilitate the described logic flow. The tVnode is set equal to the vnode for the parent represented as dirVnode. The process now moves to step 407 where tVnode is tested to see if it is the root directory of the file system name space.

The root directory is the top most directory in the UNIX file system name space and is represented by the notation /. In the example of /usr/local/bin/date, the first / is the root and the directory usr resides in the root directory. Those skilled in the art would recognize that testing a vnode to see if it is a root directory involves a test in the UNIX kernel of the vnode against the global kernel symbol for the root vnode, which is available to UNIX kernel applications and device drivers. This can also be determined by obtaining the vnode for the path "/", and comparing it against the vnode, tVnode. If the result of step 407 is that tVnode is the root directory, then all the FID components of the FID chain have been obtained and added to the chain. The construction of the chain has been completed and the logic moves to step 408, which proceeds to step 415. In the presented flow of steps for the present invention, the FID for the root directory is not physically added to the FID chain. The flow could be extended to include that step. However, that is not required since reaching the end of the entries in a FID chain implies that the next entry would be the FID for root (FID(/)). Thus root FID can be omitted from the chain saving the space to store it.

If the test in 407 does not find tVnode to be the root directory as would be the case in the example path of /usr/local/bin/date where tVnode is currently the vnode for bin, then the logic proceeds to step 409. This step 409 obtains the vnode designated as PV, which is the directory of the parent. In the presented example path, /usr/local/bin/date, step 409 is currently seeking to obtain the vnode for local. The vnode for the parent directory of the currently set directory represented by tVnode is obtained using the UNIX VOP_LOOKUP( ) operation, which takes as inputs, the vnode of the directory to look in, and the string for the name of the file system resource to search for. It returns the vnode for the name on which it is searching. The UNIX string notation which represents the parent or previous directory up the file system name space is Therefore, to find the parent directory for tVnode, VOP_LOOKUP( ) is invoked as follows;

VOP_LOOKUP(tVnode, ". .",&PV)

After obtaining PV, the process proceeds to step 410, which obtains the FID corresponding to the PV. The next step 411 is to add the FID for the PV to the FID chain. The FID for the PV at this point in the example description is FID(local). The FID chain now contains the FIDs for bin and local. The process moves to step 412 where the PV is tested to see if it is the root vnode of the file system name space. If PV is the root vnode, then the FID chain construction is complete and the flow proceeds to step 414. If PV in step 412 is not the root vnode, then the processing moves to step 413 where the variable tVnode is set to the vnode PV which at this point represents the vnode for the directory local in the presented example path of /usr/local/bin/date. The process now moves to step 409 where the flow of steps to obtain the parent vnode for tVnode, generate a FID, and add the FID to the FID chain repeats. This set of steps (409-413) iterates until the FID chain construction is complete indicated by reaching the root of the file system name space.

Once the FID chain is completed as indicated in step 414, the processing moves to step 415 where the FID chain is inserted into the FID chain cache (FCC) with the first FID in the chain serving as the entry's search key. In the presented example of /usr/local/bin/date, the key is the FID for bin (FID(bin)), which is the variable dirFid as presented in the flow of steps in FIG. 4. After inserting the FID chain into the FCC, the process proceeds to step 416 where the flow of steps ends. In step 416 the obtained FID for the target (tgtFid) and the corresponding FID chain for the directory components leading to the target are returned to the invoker.

Figure 5:
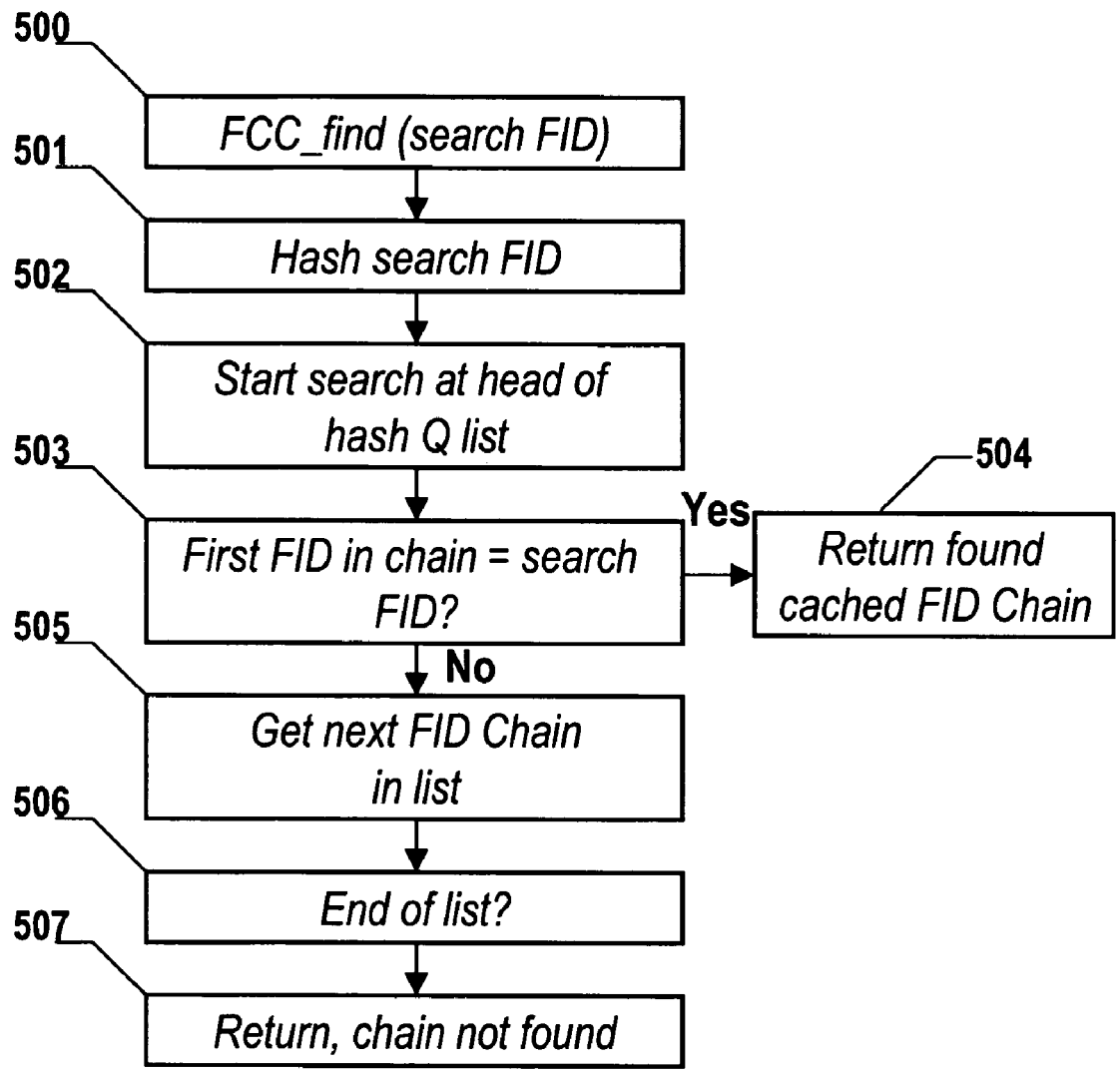
FIG. 5 is a flow diagram of the steps to find a FID chain in a FID chain cache (FCC) provided a FID specification of the terminating component of a directory path specification.

FIG. 5 illustrates the steps involved in locating a FID chain in the FID chain cache. This process uses the FID specification of the terminating component of a directory path to start the search for the FID chain. Step 500 retrieves this FID specification. In step 501, the FID would be processed into a search hash list to find a FID match. A common practice in computing and software programming for databases is to take the information and process it into a list or index. For example, one means to speed up a search for a specific FID chain would be to divide the FID chains in the cache into lists. After this sorting exercise, some additional processing occurs to determine in which list to start the search.

After selection of the initial list, step 502 begins the search with the first FID chain at the head of the list. Step 503 is a determination of whether the first FID in the chain matches the initial FID retrieved from the FID specification in step 500. If the first FID does match the initial FID, then step 504 returns a found FID chain and the process ends. If the FID in the list does not match the search FID, step 505 gets the next FID chain in the list. Step 506 determines whether the search has reached the end of the list. If the search has reached the end of the list, then no FID chain is found for the FID in the search. Step 507 returns a no FID found and the process ends. If this list has more entries, the process returns to step 503 and repeats steps 503, 505, and 506 as necessary.

Figure 6:
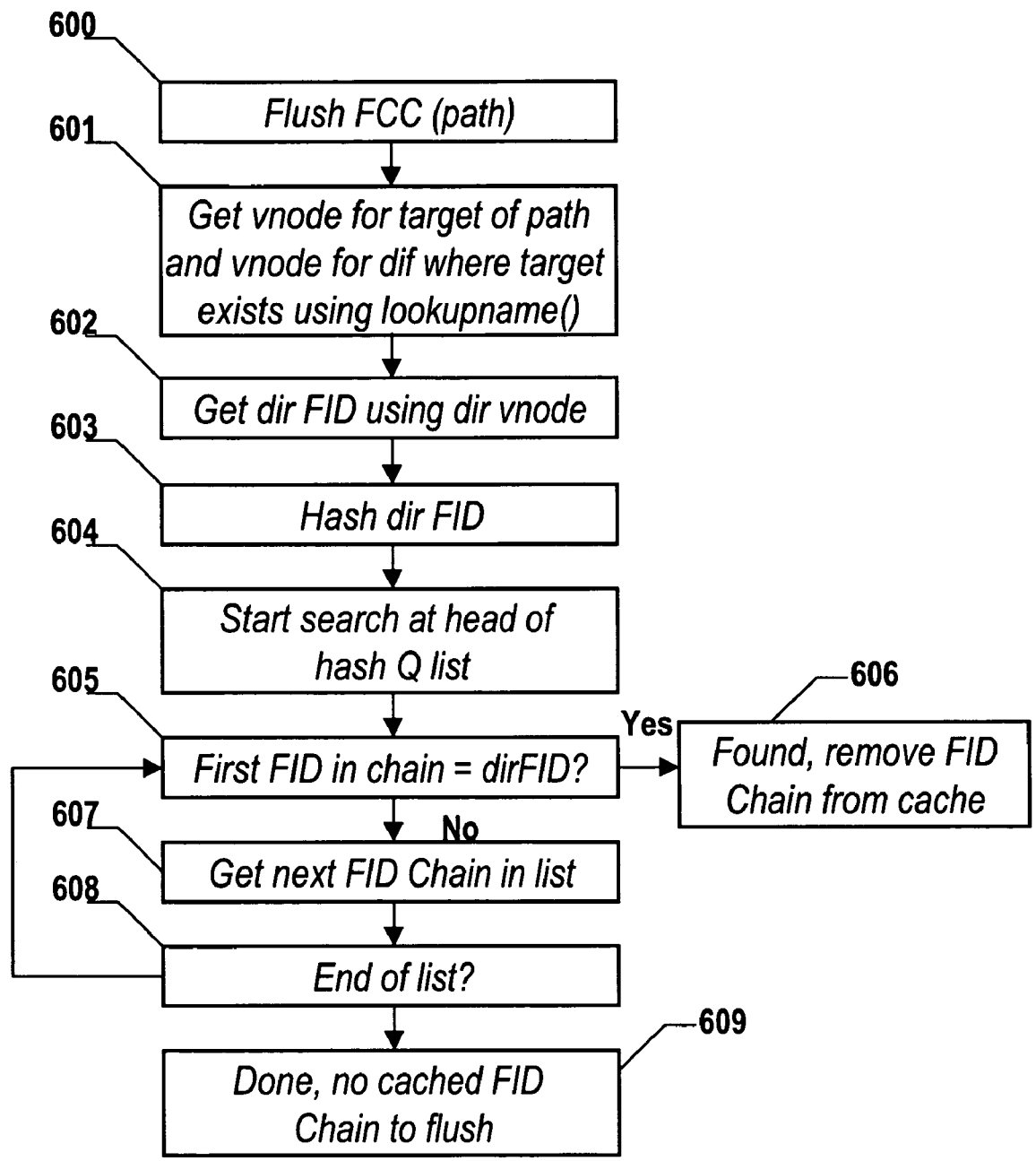
FIG. 6 is a flow diagram of the steps to invalidate one or more entries in the FID chain cache.

FIG. 6 shows the flow of steps to flush a cached FID chain from the FCC when an operation has occurred that affects the file system name space. For such an event, information in the cache might be rendered stale. An example of such an event is a rename operation on a directory. A specific example would be to rename /usr/local to /usr/loc. This would make any cached fid chain containing a FID for local stale. The flow starts in step 600 with the path name (path) describing the file system resource (which would be a path name to a directory file system resource) to be renamed. The flow proceeds to step 601 where a vnode is obtained for the directory The process moves to step 602 where the FID (dirFid) is retrieved using the vnode. The search through the FCC begins in step 603 starting with the first hash queue in the FCC and proceeds to step 604, which obtains the first FID chain in the hash queue. In step 605, all the fid chain's FIDs are compared against dirFid. If any FIDs in the chain match dirFid as tested in step 606, the FID chain is removed from the FCC in step 607 which returns back to the main flow of step 608. If in step 606, there is no match against dirFID, the FID chain is not affected, and therefore remains in the cache. The flow moves to step 608. In step 608, the next FID chain in the hash queue is retrieved. If step 608 finds there is a next FID chain in the queue, which is tested in step 609, the logic returns to step 606 where the next FID chain is processed by steps 606, 608, and possibly 607. If the end of the list has been reached, then step 610 checks to see if there are more hash queues in the FCC to search. If not, the flow moves to step 612 and ends. Otherwise the processing returns to step 604 to search the next queue. At the conclusion of the flow of steps in FIG. 6, all FIDs, which could have been rendered stale by the operation on path, are removed from the FCC, as that operation potentially affected the name space of the file system with respect to path.

Figure 7:
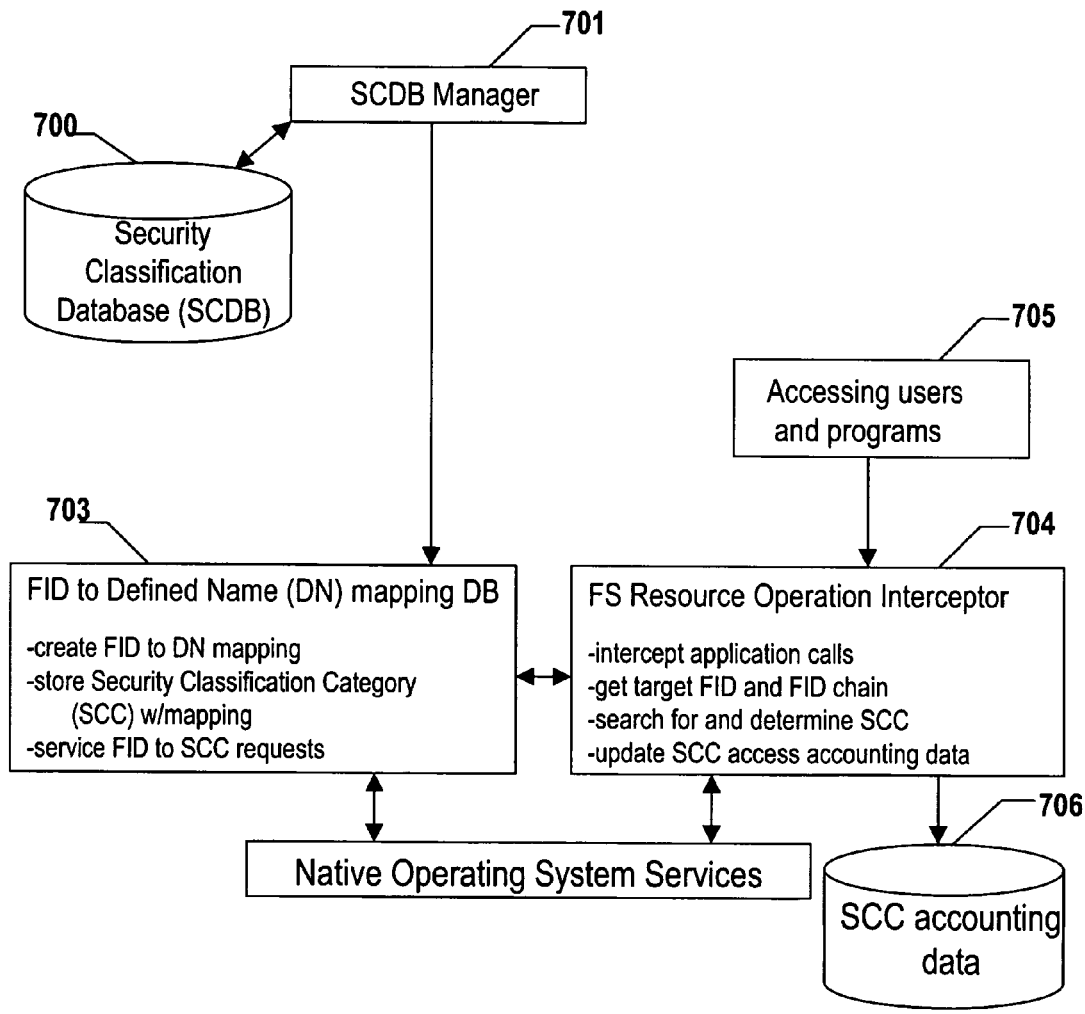
FIG. 7 is a diagram of an example high-level architecture of the described SCS embodiment.

FIG. 7 illustrates a high level architecture of the example Security Classification System (SCS) containing the described techniques of the present invention. In the diagram, box 700 is the repository holding Security Classification Categories (SCCs) which are defined for file system resources using the full path name of the resource. This name is termed a Defined Name, or DN in the example system. The SCDB Manager, shown in box 701 could be in the form of a machine or process on a system which might reside in a network of computers. When the SCS starts on a system where it has been applied, in box 703, it first extracts the records in the SCDB, obtains a FID for the DN in the record, and creates an entry in the FID to DN mapping database. Each entry has the DN and associated SCC contained in it for the entry's FID which acts as the search key into the database. Box 703 makes use of the techniques described in FIG. 1 of the present invention. Box 705 of FIG. 7 represents the programs and users which access file system resources on a system where SCS monitoring runs. File system resources are accessed using Application Programming Interfaces (APIs). Box 704 represents the component of the SCS, which intervenes in accesses to file system resources. It may do this through a variety of techniques, which exist in the practiced art. Examples might include, library replacement, system call table modification, or command replacement. The techniques, in box 704, utilized the processes in FIGS. 2, 3, 4, 5 and 6. Box 706 of figure represents a potential location where accounting data collected might be logged.

Figure 8:
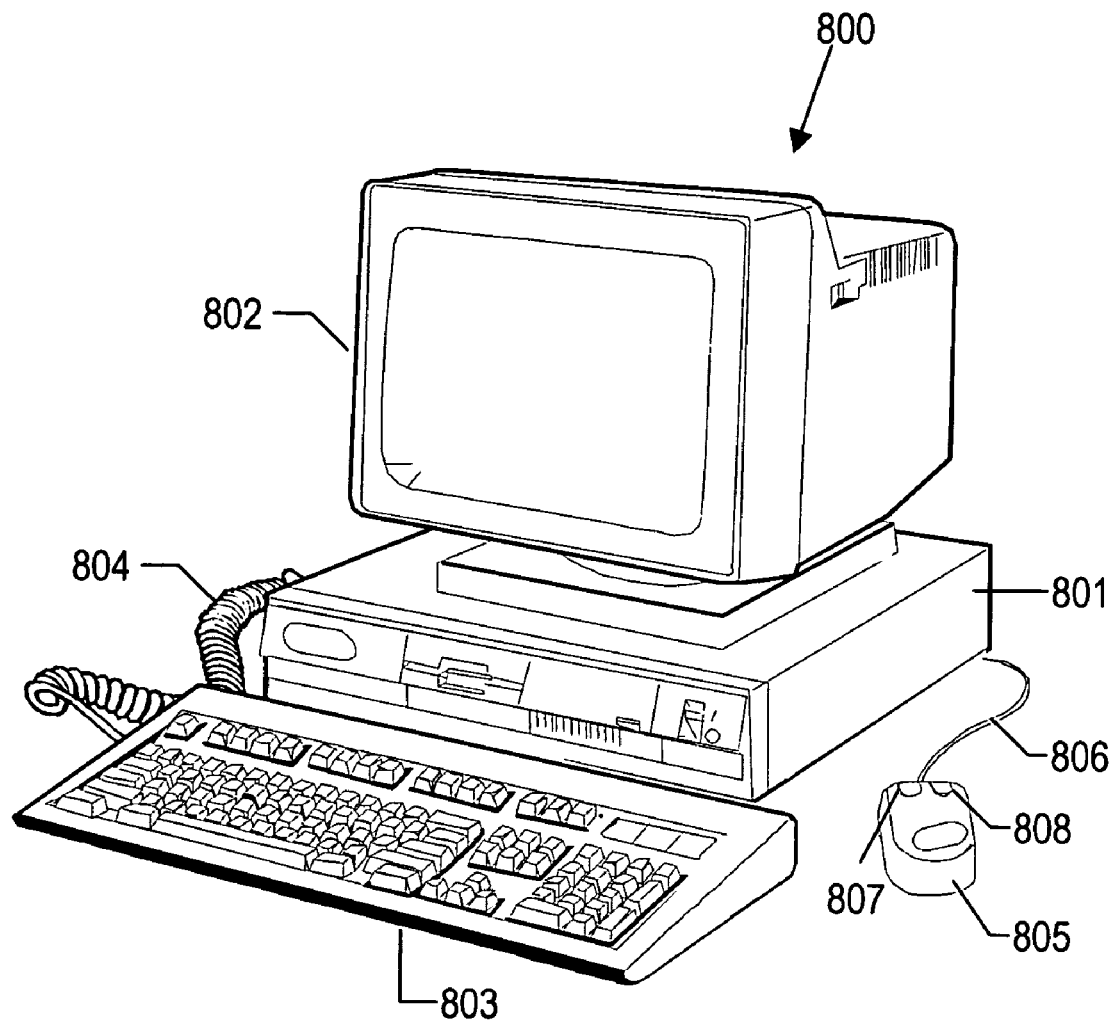
FIG. 8 depicts a pictorial representation of data processing system, which may be used in implementation of the present invention.

FIG. 8 depicts a pictorial representation of data processing system 800 which may be used in implementation of the present invention. As may be seen, data processing system 801 includes processor 801 that preferably includes a graphics processor, memory device and central processor (not shown). Coupled to processor 801 is video display 802 which may be implemented utilizing either a color or monochromatic monitor, in a manner well known in the art. Also coupled to processor 801 is keyboard 803. Keyboard 803 preferably comprises a standard computer keyboard, which is coupled to the processor by means of cable 804. Also coupled to processor 801 is a graphical pointing device, such as mouse 805. Mouse 805 is coupled to processor 801, in a manner well known in the art, via cable 806. As is shown, mouse 805 may include left button 807, and right button 808, each of which may be depressed, or "clicked", to provide command and control signals to data processing system 800. While the disclosed embodiment of the present invention utilizes a mouse, those skilled in the art will appreciate that any graphical pointing device such as a light pen or touch sensitive screen may be utilized to implement the method and apparatus of the present invention. Upon reference to the foregoing, those skilled in the art will appreciate that data processing system 800 may be implemented utilizing a personal computer.

Although the various methods described are conveniently implemented in a general-purpose computer selectively activated or reconfigured by software, one of ordinary skill in the art would also recognize that such methods may be carried out in hardware, in firmware, or in more specialized apparatus constructed to perform the required method steps.

Further, it is important to note that while the present invention has been described in the context of a fully functioning data processing system, those skilled in the art will appreciate that the processes of the present invention are capable of being distributed in the form of instructions in a computer readable medium and a variety of other forms, regardless of the particular type of medium used to carry out the distribution. Examples of computer readable media include media such as EPROM, ROM, tape, floppy disc, hard disk drive, RAM, and CD-ROMs. Examples of and transmission-type of media, such as digital and analog communications links.

Having thus described the invention, what we claims as new and desire to secure by Letters Patent is set forth in the following claims.

I claim:

1. A method for constructing and caching a chain of file identifiers in a computing system environment the chain of file identifiers representing a full path to a file system resource the method comprising the steps of:

processing a file system resource s defined name (DN) into a file identifier (FID) and defined name database;

retrieving from the defined name database a first file identifier for a first file system resource, the retrieved file first identifier corresponding to a first defined name of the first file system resource;

adding the retrieved first file identifier to a chain of file identifiers, the added file identifier being the first file identifier in the chain;

retrieving a second file identifier for a second file system resource in a full path of the first file system resource;

adding the second retrieved file identifier to the chain; and repeating retrieving a next file identifier for a next file system resource and adding the next retrieved file identifier to the chain until a file identifier for each file system resource in a full path of the first file system resource is retrieved and added in the chain;

storing the constructed chain of file identifiers (FID) in a cache storage location; and detecting an access attempt and a path name being used to access the file system resource;

retrieving a target file identifier (FID) of the access attempt; and determining whether a desired operation causes the cached FID chain to become invalid by using externally stored attributes, the attributes being security rules for system resources, the security rules of a directory are attached to all files in the directory.

2. A computer program product in a computer readable storage medium for use in constructing and caching a chain of file identifiers in a computing system environment, the chain of file identifiers representing that represent a full path to a file system resource comprising:

instructions for processing a file system resource's defined name (DN) into a file identifier (FID) and defined name database;

instructions retrieving from the defined name database a first file identifier for a first file system resource, the retrieved first file identifier corresponding to a defined name of the first file system resource;

instructions adding the retrieved first file identifier to a chain of file identifiers, the added first file identifier being the first file identifier in the chain;

instructions retrieving a second file identifier for a second file system resource in a full path of the first file system resource;

instructions adding the second retrieved file identifier to the chain;
instructions repeating said instructions for retrieving a next file identifier for a next file system resource and said instructions for adding the next retrieved file identifier to the chain until a file identifier for each file system resource in a full path of the first file system resource is retrieved and added in the chain;
instructions storing the constructed chain of file identifiers in a cache storage location;
instructions detecting an access attempt and a path name being used to access the file system resource;
instructions retrieving a target file identifier (FID) of the access attempt; and
instructions determining whether a desired operation causes the a cached FID chain to become invalid by using externally stored attributes, the attributes being security rules for system resources, the security rules of a directory are attached to all files in the directory.

3. A computer connectable to a distributed computing system for constructing and caching a chain of file identifiers in a computing system environment, the chain of file identifiers representing a full path to a file system resource which includes file system object containing information accessed during the execution of application and system program comprising:
a computing device having;
a processor;
a native operating system; and
application programs; and
an external authorization system augmenting standard security controls of said native operating system, said external authorization system comprising:
an external authorization program overlaying said native operating system for:
processing a file system resource's defined name (DN) into a file identifier (FID) and defined name database;
retrieving from the defined name database a first file identifier for a first file system resource, the retrieved first file identifier corresponding to a first defined name of the first file system resource;
adding the retrieved first file identifier to a chain of file identifiers, the added file identifier being the first file identifier in the chain;
retrieving a second file identifier for a second file system resource in a full path of the first file system resource;
adding the second retrieved file identifier to the chain; and
repeating retrieving a next file identifier for a next file system resource and adding the next retrieved file identifier to the chain until a file identifier for each file system resource in a full path of the first file system resource is retrieved and added in the chain;
a cache storage location for storing constructed file identifier chains which represent paths to system resources, said cache storage location providing for faster searches of file identifiers; and
an access decision module within said external authorization program for determining access to protected file system objects by:
detecting an access attempt and a path name being used to access the file system resource;
retrieving a target file identifier (FID) of the access attempt; and
determining whether a desired operation causes the cached FID chain to become invalid by using externally stored attributes, the attributes being security rules for system resources, the security rules of a directory are attached to all files in the directory.

* * * * *